(12) United States Patent
Takahashi et al.

(10) Patent No.: US 9,461,507 B2
(45) Date of Patent: Oct. 4, 2016

(54) WIRELESS POWER TRANSMISSION SYSTEM

(71) Applicant: MURATA MANUFACTURING CO., LTD., Nagaokakyo-Shi, Kyoto-fu (JP)

(72) Inventors: Hironobu Takahashi, Nagaokakyo (JP); Keiichi Ichikawa, Nagaokakyo (JP); Tsutomu Ieki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 467 days.

(21) Appl. No.: 14/189,357

(22) Filed: Feb. 25, 2014

(65) Prior Publication Data

US 2014/0175907 A1 Jun. 26, 2014

Related U.S. Application Data

(63) Continuation of application No. PCT/JP2012/076162, filed on Oct. 10, 2012.

(30) Foreign Application Priority Data

Oct. 12, 2011 (JP) ................................ 2011/224507

(51) Int. Cl.
*H02J 17/00* (2006.01)
*H02J 7/02* (2016.01)

(52) U.S. Cl.
CPC ................ *H02J 17/00* (2013.01); *H02J 7/025* (2013.01)

(58) Field of Classification Search
CPC ............ H02J 17/00; H02J 7/025; H02J 5/005
See application file for complete search history.

(56) References Cited

U.S. PATENT DOCUMENTS

| 8,536,739 | B2 | 9/2013 | Ichikawa et al. |
| 8,587,157 | B2 | 11/2013 | Camurati et al. |
| 2011/0227420 | A1 | 9/2011 | Urano |

FOREIGN PATENT DOCUMENTS

| CN | 102195366 A | 9/2011 |
| JP | 2009-531009 A | 8/2009 |
| WO | WO-2010-150317 A1 | 12/2010 |

OTHER PUBLICATIONS

Written Opinion and International Search Report issued in PCT/JP2012/076162 mailed on Nov. 27, 2012.

*Primary Examiner* — Jeffrey Shin
(74) *Attorney, Agent, or Firm* — Arent Fox LLP

(57) ABSTRACT

A power transmitting apparatus includes an active electrode, a passive electrode, a voltage generating circuit that applies a voltage between the active electrode and the passive electrode, and a reference potential electrode connected to a reference potential. A power receiving apparatus includes an active electrode, a passive electrode, a secondary battery connected between the active electrode and the passive electrode, and a reference potential electrode connected to a reference potential. Power is transmitted from the power transmitting apparatus to the power receiving apparatus as a result of the respective electrodes facing each other and being capacitively coupled to each other when the power receiving apparatus is mounted to the power transmitting apparatus.

20 Claims, 12 Drawing Sheets

WIRELESS POWER TRANSMISSION SYSTEM

CROSS REFERENCE TO RELATED APPLICATIONS

The present application is a continuation of PCT/JP2012/076162 filed Oct. 10, 2012, which claims priority to Japanese Patent Application No. 2011-224507, filed Oct. 12, 2011, the entire contents of each of which are incorporated herein by reference.

FIELD OF THE INVENTION

The present invention relates to wireless power transmission systems that transmit power from a power transmitting apparatus to a power receiving apparatus mounted on the power transmitting apparatus.

BACKGROUND OF THE INVENTION

Examples of typical known wireless power transmission systems include magnetic-field coupling power transmission systems in which power is transmitted from the primary coil of a power transmitting apparatus to the secondary coil of a power receiving apparatus through a magnetic field. In these systems, when power is transmitted through magnetic-field coupling, the strength of magnetic flux passing through the coils strongly influences electromotive force and, hence, high-accuracy relative positional relationship between the primary coil and the secondary coil is required. Further, it is difficult to reduce the size of the apparatuses, since coils are used.

On the other hand, an electric-field coupling wireless power transmission system such as the one disclosed in Patent Document 1 is also known. The power transmission system disclosed in Patent Document 1 is formed of a power transmitting apparatus and a power receiving apparatus each including a passive electrode and an active electrode. As a result of the active electrode of the power transmitting apparatus and the active electrode of the power receiving apparatus being placed close to each other with a gap therebetween, a strong electric field is formed between these two electrodes, whereby the electrodes are coupled through an electric field. Hence, high-efficiency power transmission is realized between the power transmitting apparatus and the power receiving apparatus. In this system disclosed in Patent Document 1, the required accuracy of the relative positional relationship between the coupling electrodes is comparatively low, and it is possible to make the sizes and thicknesses of the coupling electrodes small.

Patent Document 1: Japanese Unexamined Patent Application Publication (Translation of PCT Application) No. 2009-531009

Examples of such a power receiving apparatus include electronic apparatuses such as a cellular phone and a personal digital assistant (PDA). In recent years, these electronic apparatuses employ a user friendly capacitive input unit (touch panel) in many cases. When a power receiving apparatus includes a touch panel, the power receiving apparatus may be in a state in which the touch panel is operated while the power receiving apparatus is mounted on the power transmitting apparatus and is being charged. However the power receiving apparatus may malfunction due to an electric field formed by the active electrodes of the power transmitting apparatus and the power receiving apparatus as described above.

SUMMARY OF THE INVENTION

Hence, it is an object of the present invention to provide a wireless power transmission system that allows the potentials of a power transmitting apparatus and a power receiving apparatus to be stabilized during power transmission from the power transmitting apparatus to the power receiving apparatus, and that does not cause malfunctions of the power receiving apparatus to occur.

A wireless power transmission system according to the present invention includes: a power transmitting apparatus including: a power transmitting side active electrode, a power transmitting side passive electrode, a voltage generating circuit that applies a voltage between the power transmitting side active electrode and the power transmitting side passive electrode, and a power transmitting side reference potential electrode connected to a reference potential; and a power receiving apparatus including: a power receiving side active electrode, a power receiving side passive electrode, a load circuit connected between the power receiving side active electrode and the power receiving side passive electrode, and a power receiving side reference potential electrode connected to a reference potential. The power transmitting side passive electrode and the power receiving side passive electrode face each other, the power transmitting side reference potential electrode and the power receiving side reference potential electrode face each other, and the power transmitting side active electrode and the power receiving side active electrode face each other with an insulator therebetween and are capacitively coupled to each other, whereby power is transmitted from the power transmitting apparatus to the power receiving apparatus.

With this configuration, during power transmission, the reference potential of the power receiving apparatus is connected to the reference potential of the power transmitting apparatus through the power transmitting side and power receiving side reference potential electrodes. The reference potential of the power transmitting apparatus has relatively small variations compared with the reference potential of the power receiving apparatus. Hence, the reference potential of the power receiving apparatus is stabilized. As a result, the operations of the power receiving apparatus can be stabilized.

In the wireless power transmission system according to the present invention, it is preferable to employ a configuration in which the power receiving side active electrode is an electrode having a higher potential than the power receiving side passive electrode, and the power receiving apparatus side reference potential electrode has a potential that lies between a potential of the power receiving side active electrode and a potential of the power receiving side passive electrode, and the power transmitting side active electrode is an electrode having a higher potential than the power transmitting side passive electrode, and the power transmitting apparatus side reference potential electrode has a potential that lies between the potential of the power transmitting apparatus side active electrode and a potential of the power transmitting side passive electrode.

With this configuration, the active electrodes are electrodes having higher potentials than the passive electrodes, and high-efficiency power transmission can be realized by increasing the potentials of the capacitively coupled electrodes.

In the wireless power transmission system according to the present invention, a configuration may be employed in which the voltage generating circuit further includes a step-up transformer, and the load circuit further includes a step-down transformer.

With this configuration, high-voltage transmission becomes possible, and high-efficiency power transmission is realized.

In the wireless power transmission system according to the present invention, a configuration may be employed in which the step-down transformer includes a lead-out terminal of a secondary winding, and the lead-out terminal is connected to the power receiving side reference potential electrode.

With this configuration, the reference potential on the power receiving apparatus side can be stabilized.

In the wireless power transmission system according to the present invention, a configuration may be employed in which the load circuit is connected to the power receiving side reference potential electrode.

With this configuration, the reference potential on the power receiving apparatus side can be stabilized.

In the wireless power transmission system according to the present invention, a configuration may be employed in which the lead-out terminal of the step-down transformer is provided at a middle point of the secondary winding.

With this configuration, the reference potential on the power receiving apparatus side can be stabilized.

In the wireless power transmission system according to the present invention, a configuration may be employed in which the step-down transformer includes a lead-out terminal of a primary winding, and the lead-out terminal is connected to the power-receiving side reference potential electrode and is provided at a voltage dividing point that allows a voltage across the primary winding to be divided in an inversely proportional manner with respect to a ratio of an area of the power receiving side active electrode to an area of the power receiving side passive electrode.

With this configuration, the reference potential on the power receiving apparatus side can be stabilized.

In the wireless power transmission system according to the present invention, a configuration may be employed in which the step-up transformer includes a lead-out terminal of a secondary winding, and the lead-out terminal is connected to the power transmitting side reference potential electrode.

With this configuration, the reference potential on the power transmitting apparatus side can be stabilized.

In the wireless power transmission system according to the present invention, a configuration may be employed in which the lead-out terminal of the step-up transformer is provided at a middle point of the secondary winding.

With this configuration, the reference potential on the power transmitting apparatus side can be stabilized.

In the wireless power transmission system according to the present invention, a configuration may be employed in which the lead-out terminal of the step-up transformer is provided at a voltage dividing point that allows a voltage across the secondary winding to be divided in an inversely proportional manner with respect to a ratio of an area of the power transmitting side active electrode to an area of the power transmitting side passive electrode.

With this configuration, the reference potential on the power receiving apparatus side can be stabilized.

In the wireless power transmission system according to the present invention, a configuration may be employed in which the power receiving apparatus includes a conductive casing, and the power receiving side reference potential electrode and a ground terminal of the load circuit are electrically connected to the casing.

With this configuration, since energy leaking to stray capacitance is reduced, high-efficiency power transmission can be realized.

In the wireless power transmission system according to the present invention, a configuration may be employed in which the power transmitting side active electrode, the power transmitting side passive electrode; and the power transmitting side reference potential electrode are provided on a first plane, and the power receiving side active electrode, the power receiving side passive electrode, and the power receiving side reference potential electrode are provided on a second plane that faces the first plane with a predetermined distance therebetween.

With this configuration, generation of parasitic capacitance in the active electrodes and the passive electrodes can be suppressed and its influence can be reduced by surrounding the active electrodes and the passive electrodes with the reference potential electrodes.

In the wireless power transmission system according to the present invention, a configuration may be employed in which the power transmitting side active electrode, the power transmitting side passive electrode, and the power transmitting side reference potential electrode are rectangular electrodes that are provided so as to be adjacent to one another in a predetermined direction; and the power receiving side active electrode, the power receiving side passive electrode, and the power receiving side reference potential electrode are rectangular electrodes that are provided so as to be adjacent to one another in the predetermined direction.

With this configuration, when the power receiving apparatus is mounted on the power transmitting apparatus, variations in the opposing area can be suppressed by making the electrodes have rectangular shapes, as a result of the mounting manner.

In the wireless power transmission system according to the present invention, a configuration may be employed in which the power transmitting side active electrode is an electrode shaped like a circle, the power transmitting side reference potential electrode is an electrode that is concentric with the power transmitting side active electrode and is shaped like a ring having a larger radius than the power transmitting side active electrode, the power transmitting side passive electrode is an electrode that is concentric with the power transmitting side active electrode and is shaped like a ring having a larger radius than the power transmitting side reference potential electrode, the power receiving side active electrode is an electrode shaped like a circle, the power receiving side reference potential electrode is an electrode that is concentric with the power receiving side active electrode and is shaped like a ring having a larger radius than the power receiving side active electrode, and the power receiving side passive electrode is an electrode that is concentric with the power receiving side active electrode and is shaped like a ring having a larger radius than the power receiving side reference potential electrode.

With this configuration, even when the power receiving apparatus is mounted on the power transmitting apparatus in such a manner as to be shifted in the rotational direction, the electrodes face one another and hence, variations in the efficiency of power transmission can be reduced.

In the wireless power transmission system according to the present invention, a configuration may be employed in which the power transmitting side active electrode and the power transmitting side passive electrode are provided on a first plane, the power receiving side active electrode and the power receiving side passive electrode are provided on a second plane that faces the first plane with a predetermined distance between the first and second planes, the power transmitting side reference potential electrode is provided on a third plane that is parallel with the first plane and that is opposite the second plane with the first plane therebetween, and the power receiving side reference potential electrode is provided on a fourth plane that is parallel with the second plane and that is opposite the first plane with the second plane therebetween.

With this configuration, the active electrodes and the passive electrodes can be electrostatically shielded by the reference potential electrodes.

In the wireless power transmission system according to the present invention, a configuration may be employed in which the power transmitting side active electrode and the power receiving side active electrode are arranged in such a manner as to face each other, the power transmitting side passive electrode and the power receiving side passive electrode are arranged in such a manner as to face each other with the power transmitting side active electrode and the power receiving side active electrode being sandwiched therebetween, and the power transmitting side reference potential electrode and the power receiving side reference potential electrode are arranged in such a manner as to face each other with the power transmitting side active electrode and the power receiving side active electrode and the power transmitting side passive electrode and the power receiving side passive electrode being sandwiched therebetween.

With this configuration, generation of parasitic capacitance in the active electrodes and the passive electrodes can be suppressed and its influence can be reduced as a result of the active electrodes and the passive electrodes being sandwiched between the reference potential electrodes.

In the wireless power transmission system according to the present invention, a configuration may be employed in which the power transmitting side reference potential electrode is formed of a conductive member that covers a portion or the entirety of a space including the power transmitting side active electrode and the power transmitting side passive electrode, the power receiving side reference potential electrode is formed of a conductive member that covers a portion or the entirety of a space including the power receiving side active electrode and the power receiving side passive electrode, and respective portions of the conductive members forming the power transmitting side reference potential electrode and the power receiving side reference potential electrode face each other and the portions are capacitively coupled to each other.

With this configuration, generation of parasitic capacitance in the active electrodes and the passive electrodes can be suppressed and its influence can be reduced by covering the active electrodes and the passive electrodes with the conductive member.

In the wireless power transmission system according to the present invention, a configuration may be employed in which the conductive member forming the power transmitting side reference potential electrode is at least a portion of a casing of the power transmitting apparatus.

With this configuration, by using the casing as the reference potential electrode, the number of members can be decreased and a reduction in the size of the apparatus can be realized.

In the wireless power transmission system according to the present invention, a configuration may be employed in which the conductive member forming the power receiving side reference potential electrode is at least a portion of a casing of the power receiving apparatus.

With this configuration, by using the casing as the reference potential electrode, the number of members can be decreased and a reduction in the size of the apparatus can be realized.

In the wireless power transmission system according to the present invention, a configuration may be employed in which a reference potential of the power transmitting apparatus is connected to an external ground.

With this configuration, a reference potential on the power receiving apparatus side can be further stabilized.

In the wireless power transmission system according to the present invention, a configuration may be employed in which the power transmitting side reference potential electrode and the power receiving side reference potential electrode are DC coupled to each other.

With this configuration, when the casings are formed of a metal, it is not necessary to provide separate reference potential electrodes, by utilizing the metal portions of the casings.

According to the present invention, by making the reference potential of a power receiving apparatus be the same as or approximately the same as the reference potential of a power transmitting apparatus, the reference potential of the power receiving apparatus can be stabilized. As a result, in the power receiving apparatus, the operation of a device, such as a touch panel, that operates with the reference potential as a reference can be stabilized, whereby malfunctions can be prevented.

DETAILED DESCRIPTION OF THE PREFERRED EMBODIMENTS

A wireless power transmission system according to the present embodiment includes a power transmitting apparatus and a power receiving apparatus. The power receiving apparatus is, for example, a mobile electronic apparatus including a secondary battery. Examples of the mobile electronic apparatus include a cellular phone, a personal digital assistant (PDA), a mobile music player, a notebook PC, and a digital camera. The power transmitting apparatus is a charging stand on which the power receiving apparatus is mounted and the secondary battery of the power receiving apparatus is charged.

Figure 1:
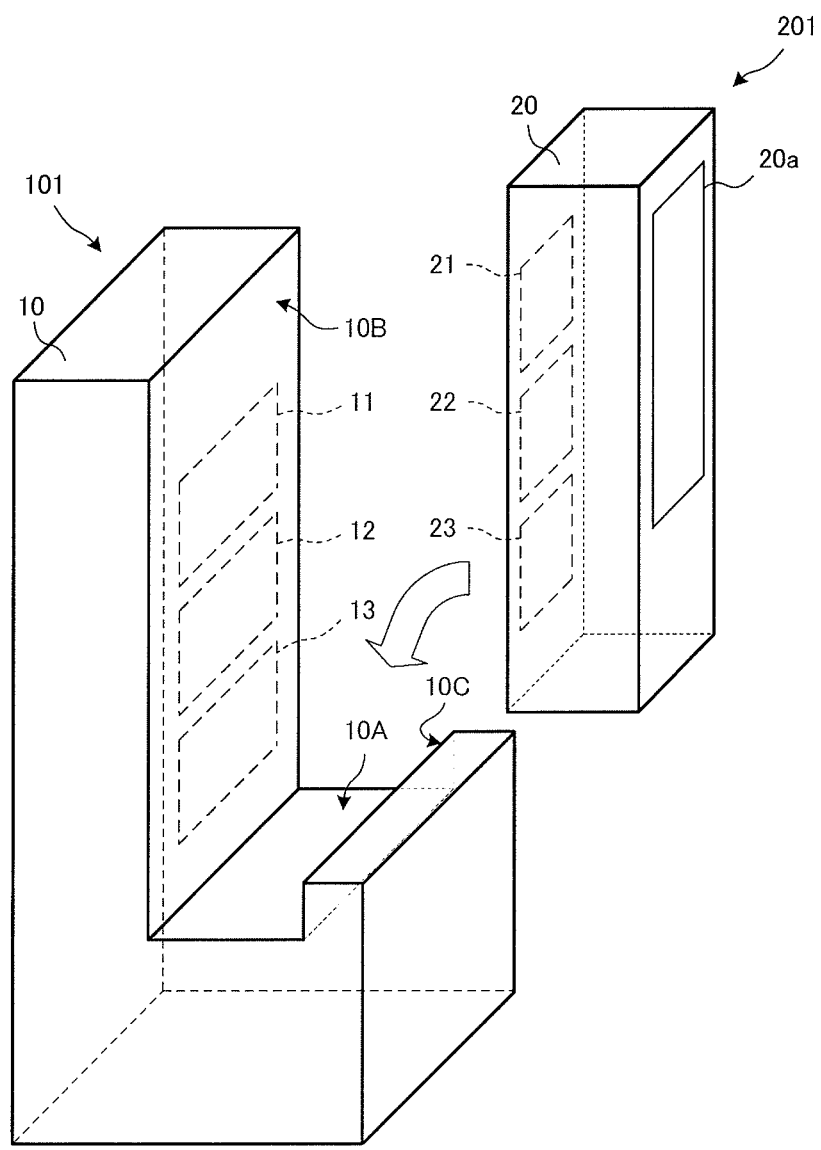
FIG. 1 is a perspective view of a power transmitting apparatus and a power receiving apparatus.

FIG. 1 is a perspective view of a power transmitting apparatus and a power receiving apparatus. A power receiving apparatus 201 includes a casing 20 that is substantially shaped like a rectangular parallelepiped and houses a secondary battery (not illustrated) therein. In the casing 20, one surface of the two opposing surfaces having the largest area is called a front surface and the other surface is called a back surface. A capacitive touch panel 20a is provided along the front surface of the casing 20. The touch panel 20a is an input unit of the power receiving apparatus 201. In other words, the touch panel 20a is an input unit in which a display function and a position input function are combined, and the power receiving apparatus 201 is operated by pressing a displayed object on the screen.

Within the casing 20, an active electrode 21, a reference potential electrode 22, and a passive electrode 23 are provided in this order on the back surface in such a manner as to be arranged in the longitudinal direction (hereinafter, called the height direction of the power receiving apparatus 201) of the back surface. In other words, the reference potential electrode 22 is sandwiched between the active electrode 21 and the passive electrode 23 in the height direction. The active electrode 21, the reference potential electrode 22, and the passive electrode 23 are respectively shaped like substantial squares and respectively face an active electrode 11, a reference potential electrode 12, and a passive electrode 13, described later, provided on a power transmitting apparatus 101 with an insulator therebetween, when the power receiving apparatus 201 is mounted on the power transmitting apparatus 101. Note that the insulator may be a plastic material forming the casings of the power transmitting apparatus and the power receiving apparatus, an insulating gas such as air, a vacuum, or the like, which exists between the opposing electrodes in such a manner that the opposing electrodes are capacitively coupled to each other.

The power transmitting apparatus 101 includes a mounting surface 10A which is substantially parallel with an installation surface, and includes a back rest surface 10B and a front surface 10C which face each other in parallel and are substantially perpendicular to the mounting surface 10A. The mounting surface 10A, the back rest surface 10B, and the front surface 10C are respectively shaped like rectangles. One long side of the mounting surface 10A coincides with one short side of the back rest surface 10B, and the other long side of the mounting surface 10A coincides with one long side of the front surface 10C.

The power receiving apparatus 201 is mounted on the power transmitting apparatus 101 in such a manner that the bottom surface of the power receiving apparatus 201 is on the mounting surface 10A side and the back surface of the power receiving apparatus 201 is on the back rest surface 10B side. The size of the front surface 10C has been determined so that the front surface 10C does not overlap the touch panel 20a provided on the front surface of the casing 20 when the power receiving apparatus 201 is mounted on the power transmitting apparatus 101.

Within a casing 10, the active electrode 11, the reference potential electrode 12, and the passive electrode 13 are provided on the back rest surface 10B in such a manner as to be arranged in the longitudinal direction (hereinafter, called the height direction of the power transmitting apparatus 101) thereof. The active electrode 11, the reference potential electrode 12, and the passive electrode 13 are respectively shaped like squares, and respectively face the active electrode 21, the reference potential electrode 22, and the passive electrode 23 with an insulator therebetween when the power receiving apparatus 201 is mounted on the power transmitting apparatus 101. An AC voltage that has been converted from a DC voltage provided from an AC adapter (not illustrated) and stepped up is applied between the active electrode 11 and the passive electrode 13.

In the wireless power transmission system according to the present embodiment, when the power receiving apparatus 201 is mounted on the power transmitting apparatus 101, the passive electrodes 13 and 23 face each other and the active electrodes 11 and 21 face each other. As a result of a voltage being applied between the active electrode 11 and the passive electrode 13, an electric field is generated between the active electrodes 11 and 21 arranged in such a manner as to face each other, whereby power is transmitted from the power transmitting apparatus 101 to the power receiving apparatus 201 through the electric field. Consequently, the secondary battery of the power receiving apparatus 201 is charged.

The reference potential electrode 12 is connected to the reference potential of the power transmitting apparatus 101, and the reference potential electrode 22 is connected to the reference potential of the power receiving apparatus 201. As a result of the reference potential electrodes 12 and 22 facing each other and being coupled to each other through an electric field, the reference potential of the power receiving apparatus 201 is made to be connected to the reference potential of the power transmitting apparatus 101.

Figure 2:
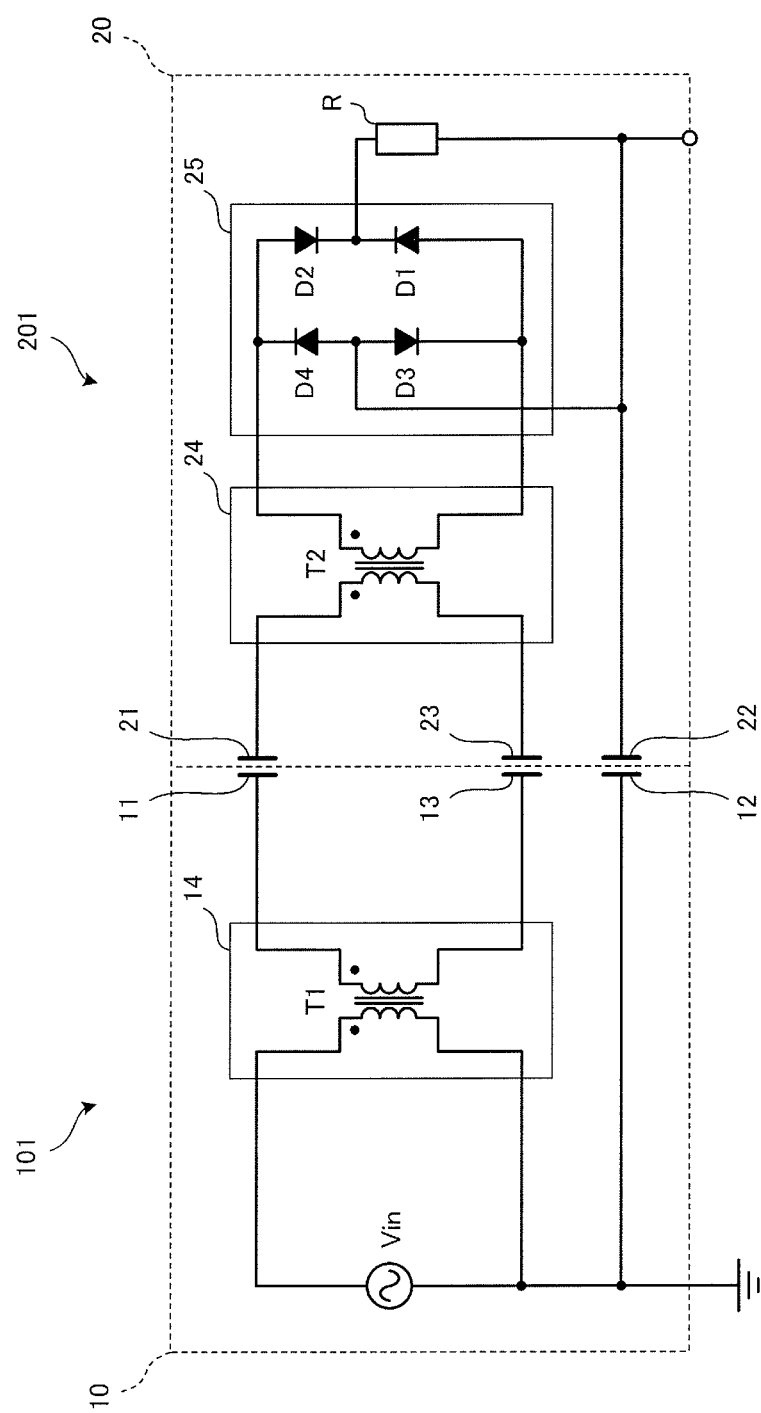
FIG. 2 is a schematic equivalent circuit diagram of a wireless power transmission system in the case where the power receiving apparatus has been mounted on the power transmitting apparatus.

FIG. 2 is a schematic equivalent circuit diagram of a wireless power transmission system in the case where the power receiving apparatus 201 has been mounted on the power transmitting apparatus 101.

The power transmitting apparatus 101 includes an input power supply Vin and a voltage step-up circuit 14. The input power supply Vin converts a DC voltage of, for example, 5 V or 12 V, which has been converted from an AC voltage of 100 V to 230 V by an AC adapter, into an AC voltage and outputs the converted AC voltage to the voltage step-up circuit 14. The voltage step-up circuit 14, which includes a step-up transformer T1, steps up the AC voltage input from the input power supply Vin and applies the stepped-up AC voltage between the active electrode 11 and the passive electrode 13. The applied voltage has a frequency ranging from 100 kHz to 10 MHz.

The power receiving apparatus 201 includes a voltage step-down circuit 24 and a rectifier circuit 25. The voltage step-down circuit 24 is formed of a voltage step-down transformer T2, and the rectifier circuit 25 is connected to the secondary side of the voltage step-down transformer T2. The rectifier circuit 25, which includes a bridge circuit formed of diodes D1, D2, D3, and D4, rectifies an AC voltage stepped down by the voltage step-down circuit 24, and applies the rectified voltage to a load R. The load R is a secondary battery and is charged as a result of a voltage stepped down and rectified by the voltage step-down circuit 24 and the rectifier circuit 25 being applied to the load R.

The reference potential electrode 12 is connected to the reference potential of the power transmitting apparatus 101. In FIG. 2, the reference potential is the external ground, such as the earth, a floor, or a desk. The reference potential electrode 22 of the power receiving apparatus 201 facing the reference potential electrode 12 is connected to the reference potential (such as the ground pattern of the circuit substrate or the shield case of the casing) of the power receiving apparatus 201. The touch panel 20a is also connected to this reference potential of the power receiving apparatus 201, and the touch panel 20a operates with this reference potential as a reference.

These reference potential electrodes 12 and 22 are arranged in such a manner as to face each other with an insulator therebetween and are coupled to each other through an electric field when the power receiving apparatus 201 is mounted on the power transmitting apparatus 101. As a result, the reference potential on the power receiving apparatus 201 side becomes approximately the same as the reference potential of the power transmitting apparatus 101. On the power transmitting apparatus 101 side, since a reduction in the weight is not so much required as in the power receiving apparatus 201, the conductor portion can be made larger or thicker than on the power receiving apparatus 201 side to stabilize the reference potential. As a result, the reference potential on the power receiving apparatus 201 side can be stabilized by making the reference potential of the power receiving apparatus 201 approximately the same as the more stable reference potential on the power transmitting apparatus 101.

The touch panel 20a detects a capacitance or a change in capacitance generated between the finger of a user and the touch panel 20a. At this time, since the reference of the ground potential of the user is the earth, a floor, or the like, the touch panel 20a may malfunction when variations in a reference potential difference between the user and the power receiving apparatus 201 are large. Hence, by making the reference potential electrodes 12 and 22 be capacitively coupled to each other and thereby making the reference potentials of the power transmitting apparatus 101 and the power receiving apparatus 201 be approximately the same, the occurrence of a malfunction of the touch panel 20a can be suppressed even when the touch panel 20a is operated by a user during charging since there are no large variations in the potential difference between the power receiving apparatus 201 and the user.

Note that the circuit configurations of the power transmitting apparatus 101 and the power receiving apparatus 201 may be appropriately modified. For example, the voltage step-up circuit 14 and the voltage step-down circuit 24 in FIG. 2 may not be provided. Further, although FIG. 2 illustrates an example in which the reference potential of the power transmitting apparatus 101 is connected to the external ground, the power transmitting apparatus 101 need not be connected to the external ground. However, in order to stabilize the reference potential on the power receiving apparatus 201 side by connecting the power transmitting apparatus 101 and the power receiving apparatus 201 to each other through the reference potential electrodes 12 and 22, it is at least required that the ground potential on the power transmitting apparatus 101 side be more stable than on the power receiving apparatus 201 side. Other than the above, FIG. 3 to FIG. 6 illustrate modifications of the circuit configurations of the power transmitting apparatus 101 and the power receiving apparatus 201.

Figure 3:
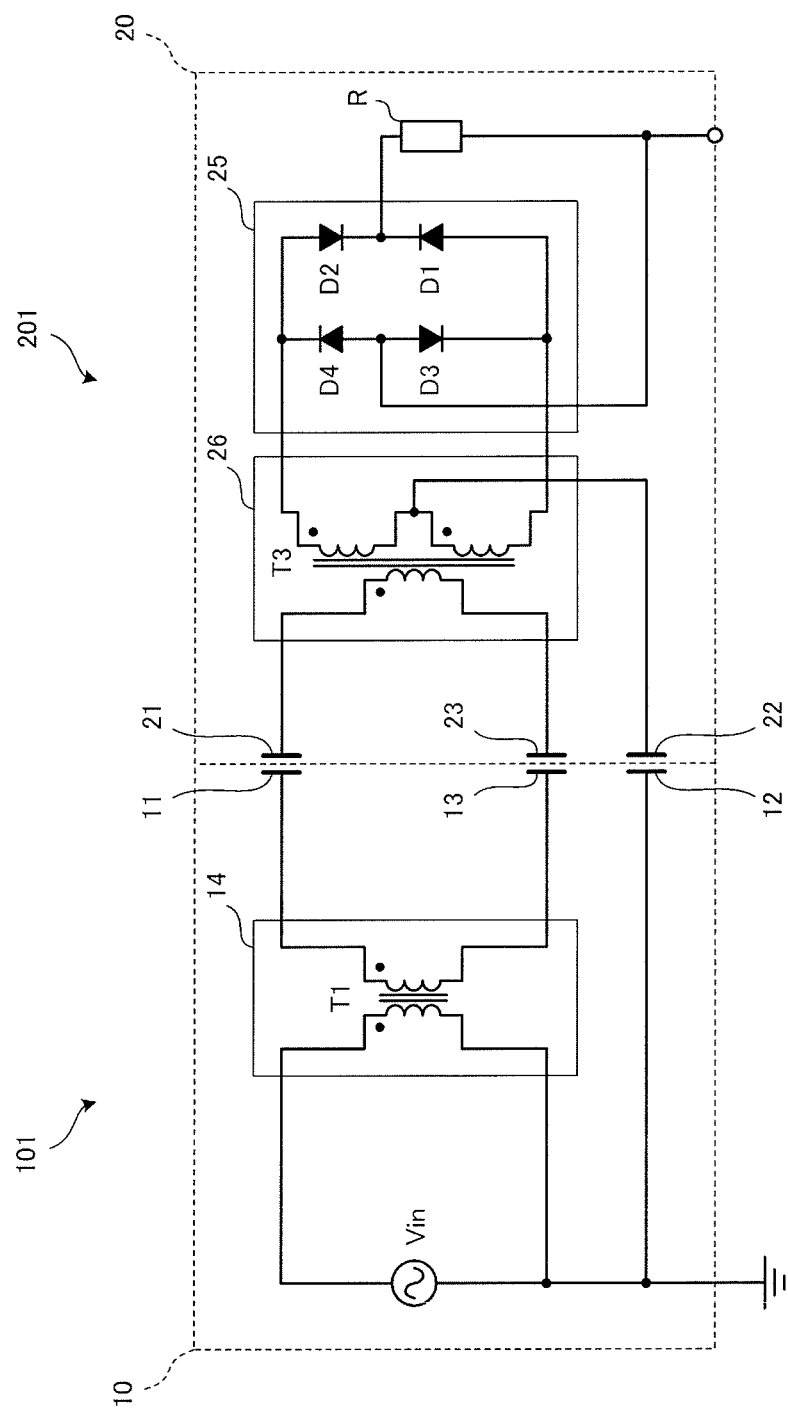
FIG. 3 is a diagram illustrating a modification of the circuit configurations of the power transmitting apparatus and the power receiving apparatus.

Referring to FIG. 3, the power receiving apparatus 201 includes a voltage step down circuit 26 that includes a transformer T3 including a primary winding and a secondary winding. The transformer T3 has a center tap (lead-out terminal) provided at the center of the secondary winding, and the center tap is connected to the reference potential electrode 22. On the other hand, the rectifier circuit 25 and the load R are connected to the reference potential of the power receiving apparatus 201. In other words, in the case of FIG. 3, the voltage step down circuit 26 and the rectifier circuit 25 are connected to different reference potentials on the power receiving apparatus 201 side.

Figure 4:
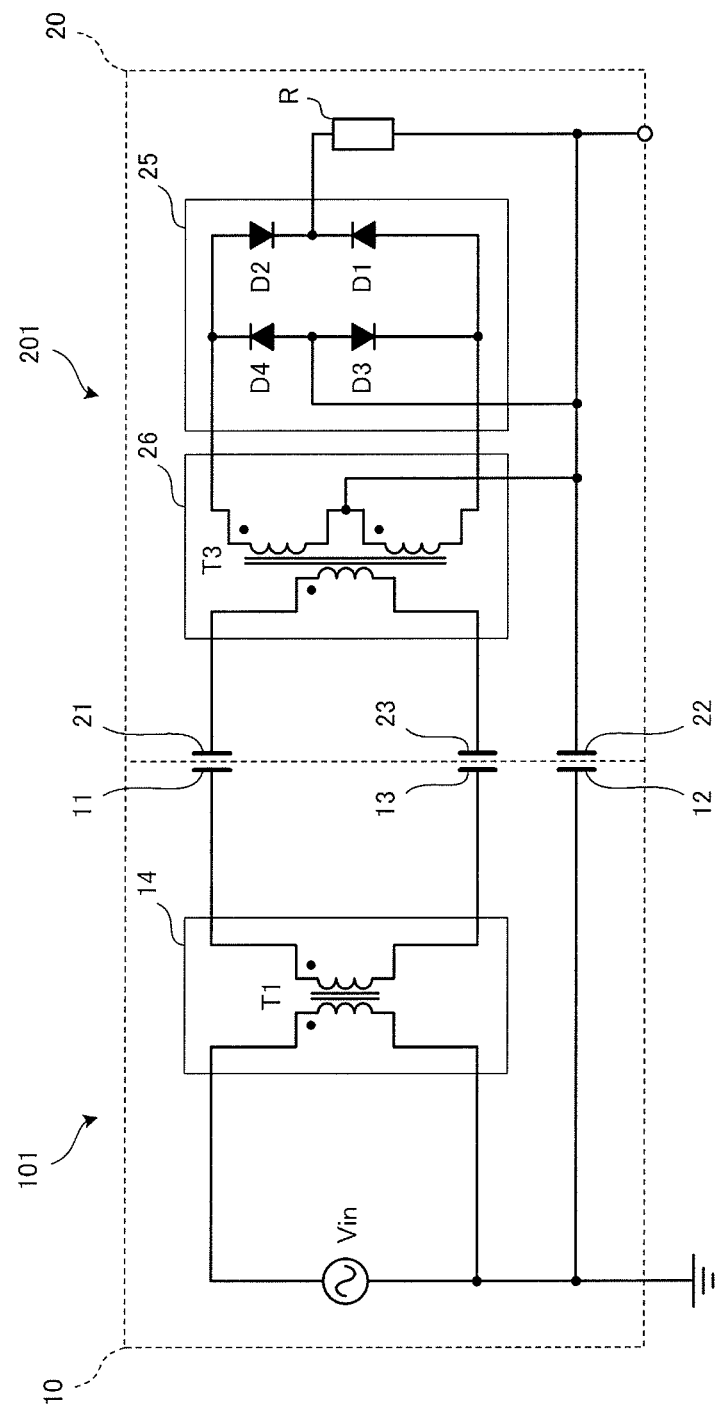
FIG. 4 is a diagram illustrating a modification of the circuit configurations of the power transmitting apparatus and the power receiving apparatus.

Further in FIG. 4, the rectifier circuit 25 and the load R are connected to the reference potential electrode 22, whereby the reference potential of the rectifier circuit 25 and the load R is made the same as the reference potential of the voltage step down circuit 26. With either of the configurations illustrated in FIG. 3 and FIG. 4, variations in the reference potential of the power receiving apparatus 201 with respect to the ground potential can be reduced. Hence, even when the touch panel 20a is operated during power transmission, the occurrence of a malfunction can be prevented.

Figure 5:
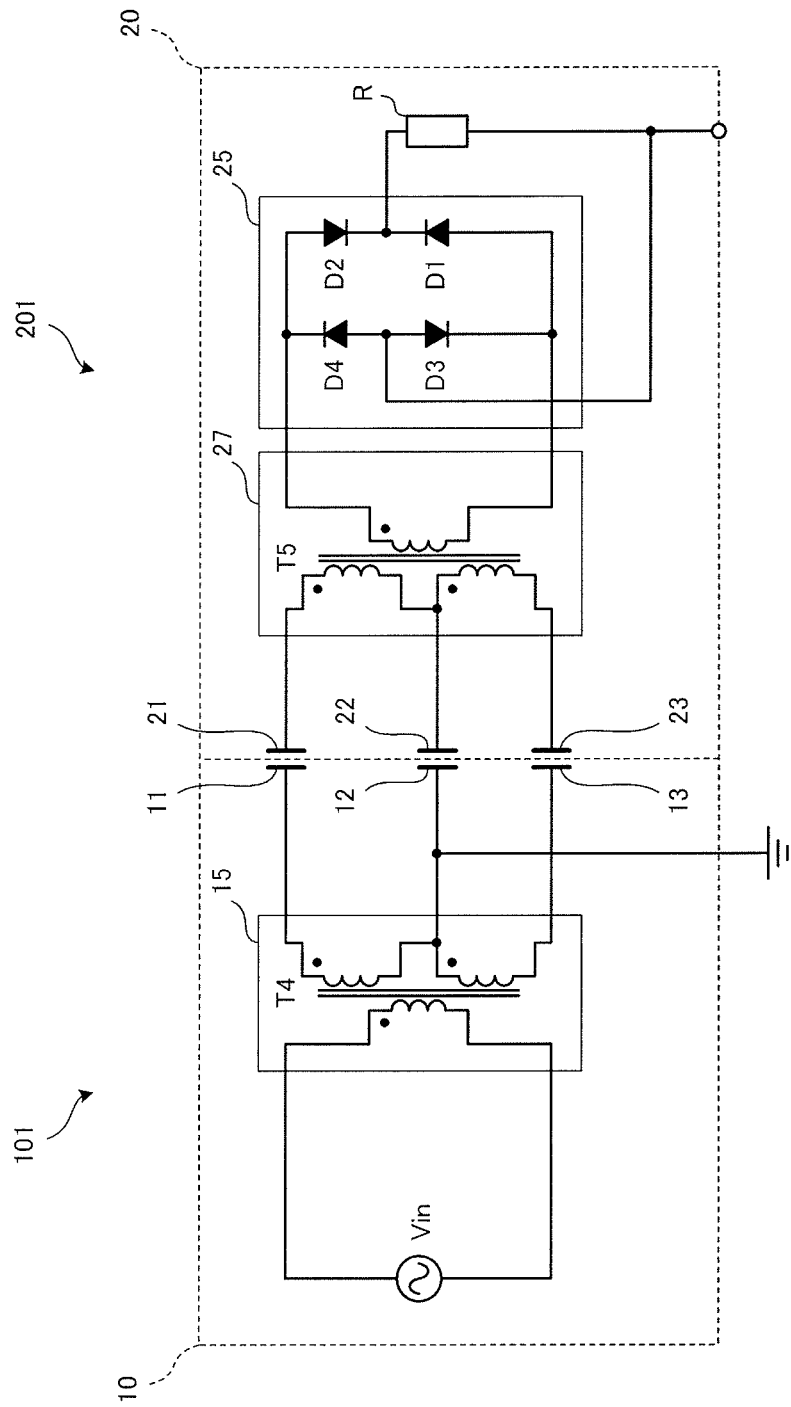
FIG. 5 is a diagram illustrating a modification of the circuit configurations of the power transmitting apparatus and the power receiving apparatus.

In FIG. 5, the power transmitting apparatus 101 includes a voltage step-up circuit 15 that includes a transformer T4. The transformer T4 includes a primary winding and a secondary winding provided with a center tap. The primary winding is connected to the input power supply Vin. One end of the secondary winding is connected to the active electrode 11, the other end is connected to the passive electrode 13, and the center tap is connected to the reference potential electrode 12. Further, the center tap of the secondary winding, i.e., the reference potential electrode 12 is connected the reference potential (external ground) of the power transmitting apparatus 101.

On the other hand, the power receiving apparatus 201 includes a voltage step-down circuit 27 that is formed of a transformer T5. The transformer T5 includes a primary winding provided with a center tap and a secondary winding. One end of the primary winding is connected to the active electrode 21, the other end is connected to the passive electrode 23, and the center tap of the primary winding is connected to the reference potential electrode 22. Further, the secondary winding is connected to the rectifier circuit 25. The rectifier circuit 25 and the load R are connected to the frame ground of the casing 20.

In the case of this configuration, even when a high voltage is applied between the active electrodes 11 and 21 or between the passive electrodes 13 and 23, since the middle point of the secondary winding of the power transmitting apparatus 101 is connected to the reference potential of the power transmitting apparatus 101, variations in the reference potential on the power transmitting apparatus 101 side are reduced. Hence, by making the reference potential on the power receiving apparatus 201 side approximately the same as the reference potential of the power transmitting apparatus 101 through the reference potential electrode 22, variations in the reference potential on the power receiving apparatus 201 side can also be suppressed. Note that, preferably, the reference potential electrode 22 is coupled to the reference potential on the power receiving apparatus 201 side through, for example, parasitic capacitance (not illustrated).

Figure 6:
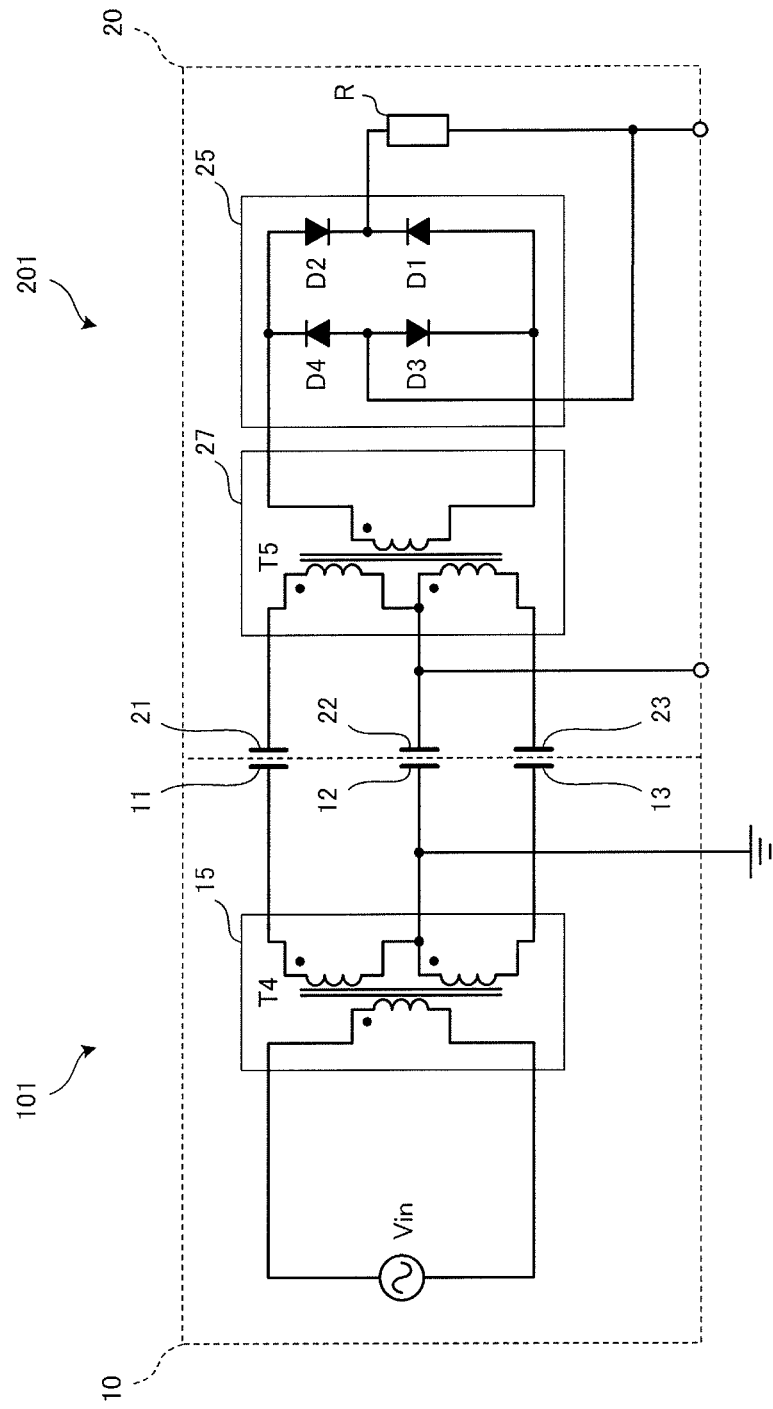
FIG. 6 is a diagram illustrating a modification of the circuit configurations of the power transmitting apparatus and the power receiving apparatus.

In FIG. 6, the center tap of the primary winding of the transformer T5 on the power receiving apparatus 201 side is further connected to the reference potential of the power receiving apparatus 201, for example, the metal casing 20 of the power receiving apparatus 201, in the configuration illustrated in FIG. 5. The rectifier circuit 25 and the load R are connected to the reference potential (metal casing) of the power receiving apparatus 201. Hence, the primary side and the secondary side of the transformer T5 are electrically connected to each other through the reference potential (metal casing) of the power receiving apparatus 201. As a result, the reference potential of the power receiving apparatus 201 can be further stabilized, whereby the occurrence of a malfunction of the touch panel 20a can be suppressed.

Note that when the areas of the opposing electrodes are made the same and the voltages of the active electrode 11 (21) and the passive electrode 13 (23) are made to have the same amplitude with opposite phases, it is preferable that the tap of the secondary winding of the transformer T4 on the power transmitting apparatus 101 side and the tap of the primary winding of the transformer T5 on the power receiving apparatus 201 side be respectively center taps (middle points) as described above.

On the other hand, the area of the active electrode 11 (21) may be made different from the area of the passive electrode 13 (23), and the voltage of the active electrode 11 (21) may be made higher than the voltage of the passive electrode 13 (23). In this case, it is not required that the tap of the secondary winding of the transformer T4 on the power transmitting apparatus 101 side and the tap of the primary winding of the transformer T5 on the power receiving apparatus 201 side, illustrated in FIG. 5 and FIG. 6, be optimally at the middle points. A more stable potential can preferably be set for the reference potential electrode 12 (22) by providing the taps of the transformers T4 and T5 at voltage dividing points that allow a voltage across the winding to be divided in an inversely proportional manner with respect to the ratio of the area of the active electrode 11 (21) to the area of the passive electrode 13 (23).

Note that although the secondary winding of the transformer T5 on the power receiving apparatus 201 side does not have a tap in FIG. 5, a configuration may be employed in which the secondary winding has a center tap connected to the reference potential electrode 22 as in the transformer T5 on the power receiving apparatus 201 side illustrated in FIG. 3.

The manner in which the electrodes (active electrodes, reference potential electrodes, and passive electrodes) of the power transmitting apparatus 101 and the power receiving apparatus 201 are arranged may be appropriately modified.

FIG. 7 to FIG. 11 are diagrams illustrating the modifications of the manner in which the active electrodes, reference potential electrodes, and passive electrodes are arranged.

Figure 7A:
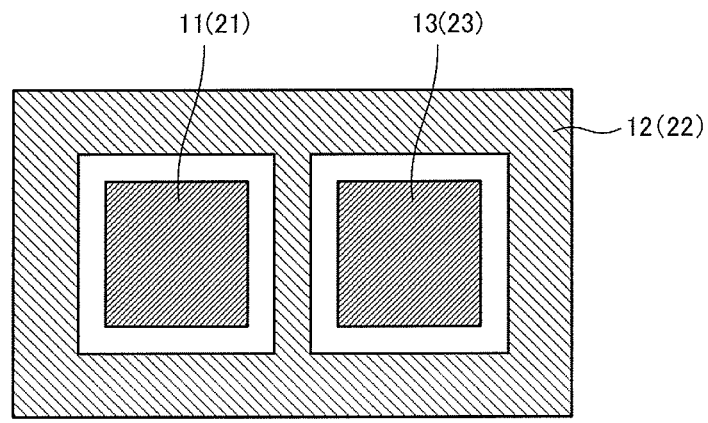
FIG. 7A is a diagram illustrating a modification of the arrangement of active electrodes, reference potential electrodes, and passive electrodes.
Figure 7B:
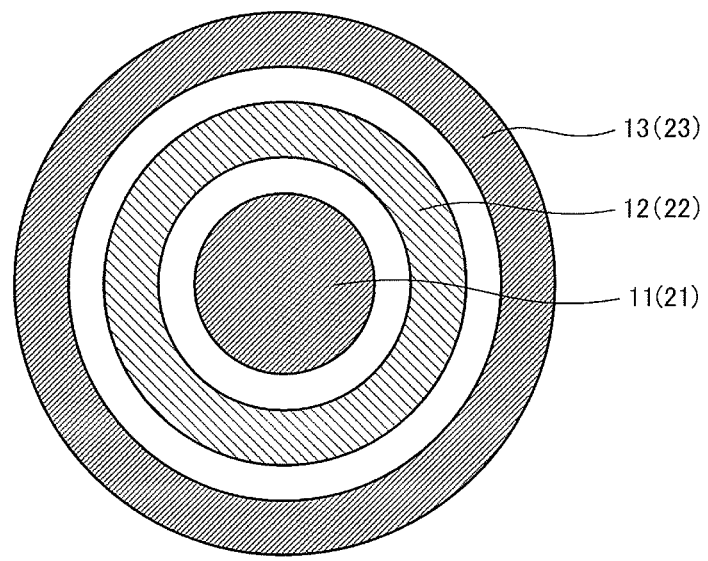
FIG. 7B is a diagram illustrating a modification of the arrangement of active electrodes, reference potential electrodes, and passive electrodes.

FIG. 7A and FIG. 7B illustrate modifications in which the electrodes (active electrode, reference potential electrode, and passive electrode) are arranged on the same plane. Although only the electrodes on the power transmitting apparatus 101 side are illustrated in FIG. 7A and FIG. 7B, the electrodes of the power receiving apparatus 201 are similarly provided and, hence, their reference symbols are illustrated in parentheses.

The active electrode 11 (21) and the passive electrode 13 (23) illustrated in FIG. 7A are substantially shaped like squares and are arranged in parallel with each other. The reference potential electrode 12 (22), which is shaped like a rectangle with the longitudinal direction being in the above arrangement direction, encloses the active electrode 11 (21) and the passive electrode 13 (23). In the case of FIG. 7A, as a result of the active electrode 11 (21) and the passive electrode 13 (23) being enclosed by the reference potential electrode 12 (22), generation of parasitic capacitance due to the active electrode 11 (21) and the passive electrode 13 (23) is suppressed and an influence therefrom can be reduced.

In this case, the potentials of the active electrode 11 (21) and the passive electrode 13 (23) have the same magnitude with opposite phases, and the potential of the reference potential electrode 12 (22) becomes an intermediate potential that lies between the potential of the active electrode 11 (21) and the potential of the passive electrode 13 (23).

In FIG. 7B, the active electrode 11 (21) is shaped like a circle, and the reference potential electrode 12 (22) is concentric with the active electrode 11 (21) and is shaped like a ring having a larger radius than the active electrode 11 (21). The passive electrode 13 (23) is concentric with the other electrodes and is shaped like a ring having a larger radius than the reference potential electrode 12 (22). In the case of FIG. 7B, coupling of opposing electrodes is maintained since the electrodes face one another even when the power receiving apparatus 201 is rotated with respect to the power transmitting apparatus 101.

Figure 8A:
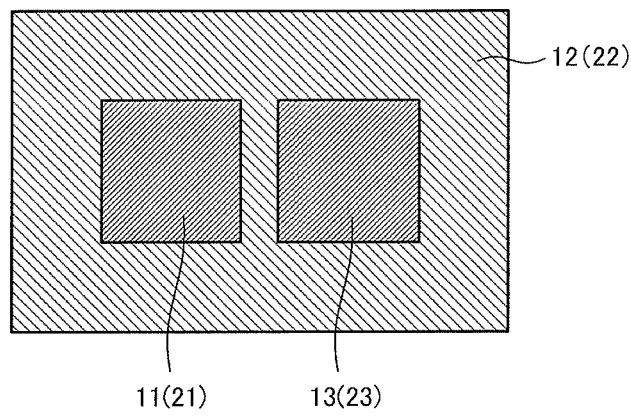
FIG. 8A is a diagram illustrating a modification of the arrangement of active electrodes, reference potential electrodes, and passive electrodes, and is a front view of the electrodes.
Figure 8B:
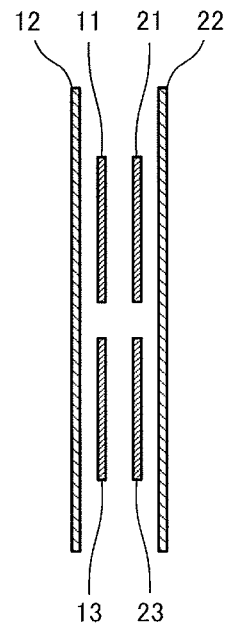
FIG. 8B is a diagram illustrating a modification of the arrangement of active electrodes, reference potential electrodes, and passive electrodes, and is a side view of the electrodes.

FIG. 8A and FIG. 8B illustrate a modification in which the active electrodes and passive electrodes are provided on planes which are different form planes on which the reference potential electrodes are provided. FIG. 8A is a front view of the electrodes and FIG. 8B is a side view of the electrodes. The active electrode 11 (21) and the passive electrode 13 (23) are respectively shaped like squares, and are arranged in parallel on the same plane. The reference potential electrodes 12 and 22, which are respectively shaped like rectangles with the longitudinal direction being in the above arrangement direction, are arranged, with the opposing active electrodes 11 and 21 and the opposing passive electrodes 13 and 23 being sandwiched therebetween, on the opposite sides of these electrodes. In other words, during power transmission, the reference potential electrode 12 and the reference potential electrode 22 face each other with the active electrodes 11 and 21 and the passive electrodes 13 and 23 being sandwiched therebetween. In the case of this configuration, the active electrodes 11 and 21 and the passive electrodes 13 and 23 are isolated from the outside by the reference potential electrodes 12 and 22, whereby a shift in the reference potential due to parasitic capacitance can be suppressed.

Figure 9A:
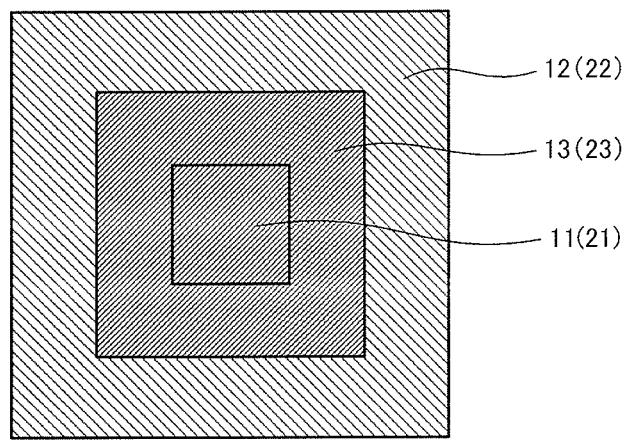
FIG. 9A is a diagram illustrating a modification of the arrangement of active electrodes, reference potential electrodes, and passive electrodes.
Figure 9B:
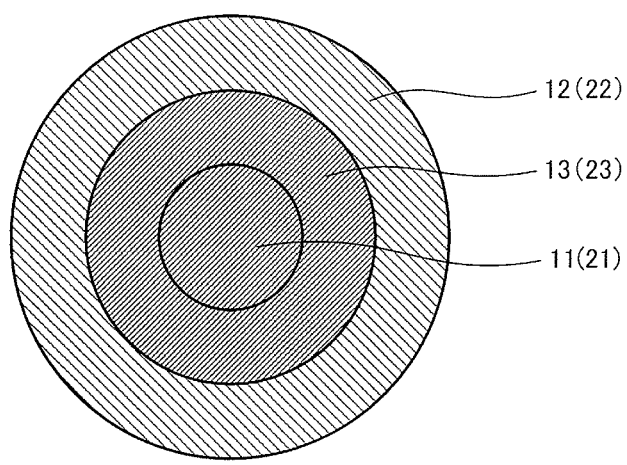
FIG. 9B is a diagram illustrating a modification of the arrangement of active electrodes, reference potential electrodes, and passive electrodes.
Figure 9C:
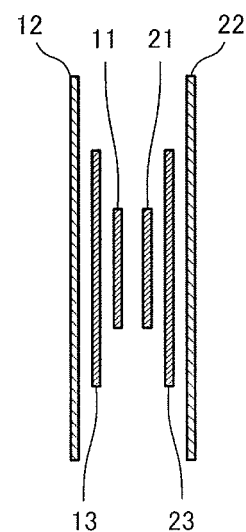
FIG. 9C is a diagram illustrating a modification of the arrangement of active electrodes, reference potential electrodes, and passive electrodes.

FIG. 9A, FIG. 9B, and FIG. 9C illustrate a modification in which the active electrodes, reference potential electrodes, and passive electrodes are respectively provided on different planes. The active electrode 11 (21), the reference potential electrode 12 (22), and the passive electrode 13 (23) illustrated in FIG. 9A are respectively shaped like squares and have the same center in plan view. Further, the passive electrode 13 (23) has longer sides than the active electrode 11 (21), and the reference potential electrode 12 (22) has still longer sides than the passive electrode 13 (23). As illustrated in FIG. 9C, when the power receiving apparatus 201 is mounted on the power transmitting apparatus 101, the electrodes are arranged on different planes in such a manner that the reference potential electrodes 12 and 22 face each other with the active electrodes 11 and 21 and the passive electrodes 13 and 23 being sandwiched therebetween, and the passive electrodes 13 and 23 face each other with the active electrodes 11 and 21 being sandwiched therebetween. Note that the electrodes may be shaped like circles as illustrated in FIG. 9B.

In the case of this configuration, the potential of the active electrode 11 (21) may be made higher than that of the passive electrode 13 (23). Further, it is not required that the taps of the transformers T4 and T5 illustrated in FIG. 5 be optimally at the middle points. A more stable potential can be set for the reference potential electrode 12 (23) by providing the taps of the transformers T4 and T5 at voltage dividing points that allow a voltage to be divided in an inverse proportional manner with respect to the ratio (potential difference) of the area of the active electrode 11 (21) to the area of the passive electrode 13 (23).

Figure 10:
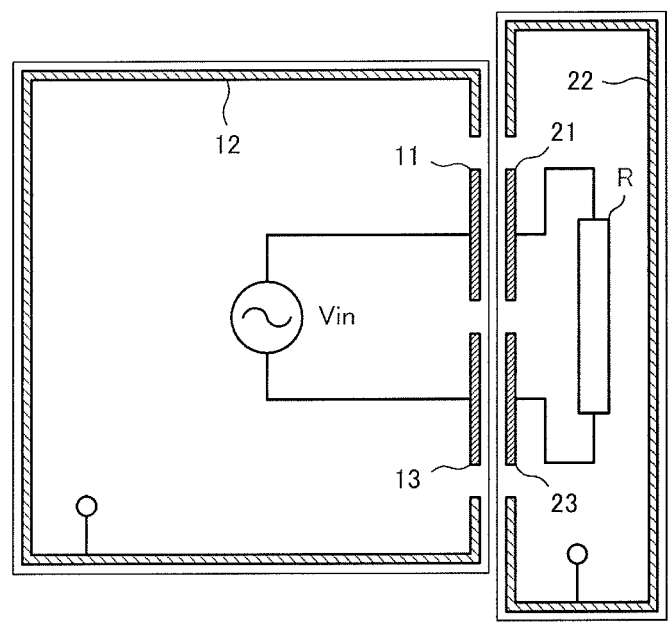
FIG. 10 is a diagram illustrating a modification of the arrangement of active electrodes, reference potential electrodes, and passive electrodes.
Figure 11:
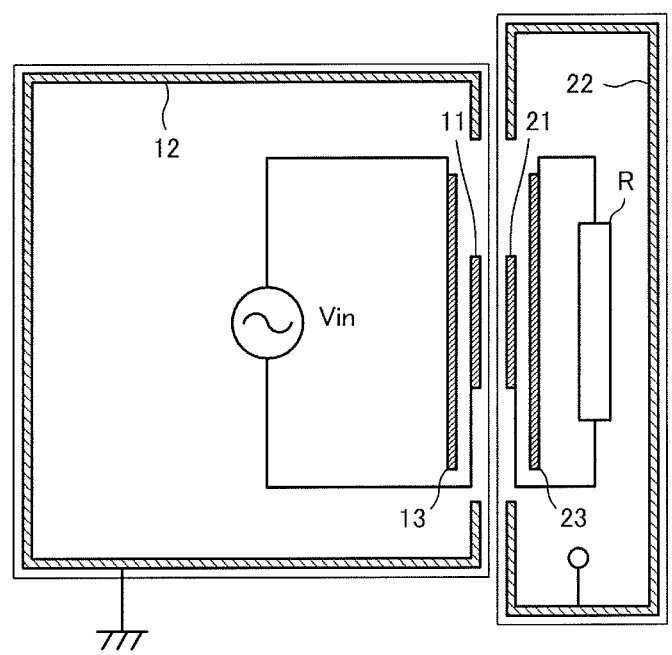
FIG. 11 is a diagram illustrating a modification of the arrangement of active electrodes, reference potential electrodes, and passive electrodes.

Further, the reference potential electrode 12 and the reference potential electrode 22 may be provided in such a manner as to cover the internal circuits of the power transmitting apparatus 101 and the power receiving apparatus 201. FIG. 10 and FIG. 11 are diagrams schematically illustrating the configurations in which the internal circuits and the like of the apparatus are covered by the reference potential electrode 12 (22). In the configuration illustrated in FIG. 10, the active electrode 11 (21) and the passive electrode 13 (23) are provided on the same plane. The reference potential electrode 12 (22) is provided in such a manner as to be integrated with the casing and to surround the active electrode 11 (21) and the passive electrode 13 (23) and circuits connected to the electrodes, for example, the input power supply Vin of the power transmitting apparatus 101 (the load R in the power receiving apparatus 201).

By employing the configuration in which the reference potential electrode 12 (22) is integrated with the casing of the apparatus, even when the apparatus is very small, the reference potential of the power transmitting apparatus 101 can be stabilized and noise generated by the high-voltage circuit in the transmission circuit is prevented from leaking to the outside. Further, influence on the ground potential of the internal circuit of the power transmitting apparatus 101 side due to parasitic capacitance or the like caused by external objects can be reduced.

Note that, on the power transmitting apparatus 101 side, the reference potential may or may not be externally grounded to, for example, the earth or a desk. Further, as illustrated in FIG. 11, the active electrode 11 (21) and the passive electrode 13 (23) may be arranged on different planes as described with reference to FIG. 9A, FIG. 9B, and FIG. 9C.

Figure 12:
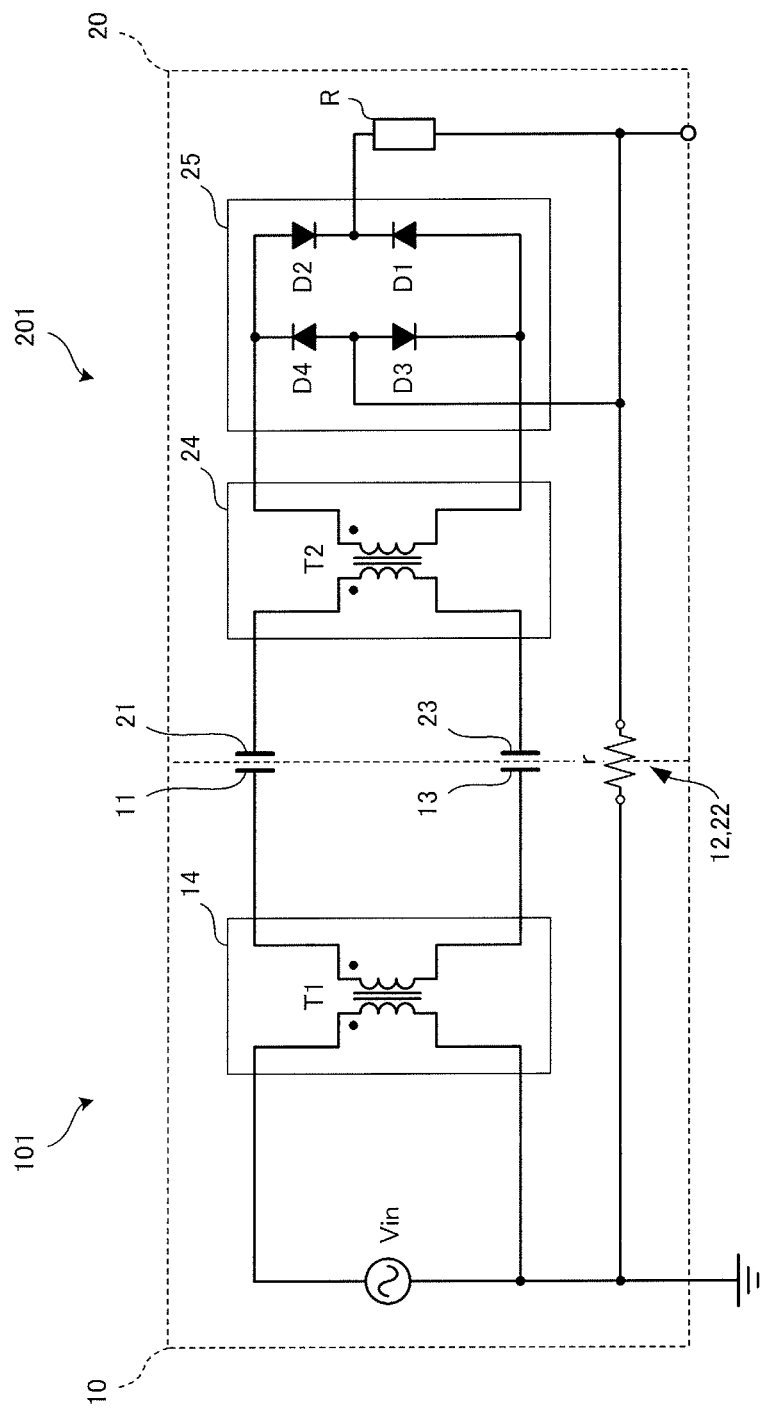
FIG. 12 is a diagram illustrating a modification of the circuit configurations of the power transmitting apparatus and the power receiving apparatus.
Figure 13:
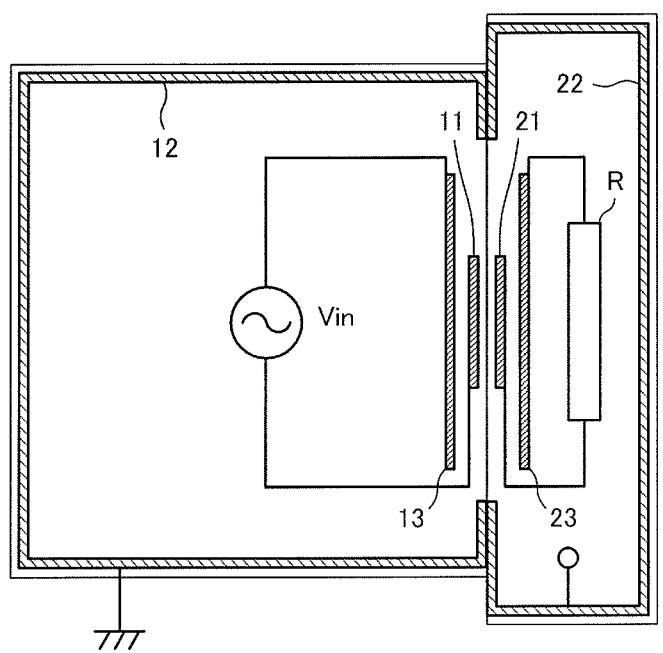
FIG. 13 is a diagram illustrating a modification of the arrangement of active electrodes, reference potential electrodes, and passive electrodes.

Further, the power transmitting side reference potential electrode 12 and the power receiving side reference potential electrode 22 facing each other with an insulator therebetween may be in direct contact with each other. FIG. 12 is a diagram illustrating a modification of the circuit configurations of the power transmitting apparatus and the power receiving apparatus. FIG. 13 is a diagram illustrating a modification of the arrangement of the active electrodes, reference potential electrodes, and passive electrodes.

FIG. 12 is a circuit diagram illustrating the case in which the power transmitting side reference potential electrode 12 and the power receiving side reference potential electrode 22 are connected to each other through DC connection rather than capacitively coupled to each other. In this case, the reference potential electrode 12 on the power transmitting side is in direct contact with the reference potential electrode 22 on the power receiving side, and the power transmitting apparatus 101 is connected to the power receiving apparatus 201 through a resistance r. The resistance r indicates that the reference potential electrodes 12 and 22 may be formed of a material with a low electrical conductivity, and a resistance element need not be explicitly provided. The resistance r may be only a contact resistance between the metal casings. Since a large current does not flow between the reference potential electrodes 12 and 22, the reference potential on the power receiving side is coupled to the reference potential on the power transmitting side and is sufficiently stabilized even when the resistance r is high to a certain degree.

As illustrated in FIG. 13, this configuration can be employed when the casings of the power transmitting apparatus and the power receiving apparatus are both made of a metal, for example, in the case where both the metal casings are made to function as the reference potential electrodes and are used in such a manner as to be partially in contact with each other. In this case it is not necessary to provide separate reference potential electrodes.

REFERENCE SIGNS LIST 10 casing
11 active electrode
12 reference potential electrode
13 passive electrode
20 casing
21 active electrode
22 reference potential electrode
23 passive electrode
101 power transmitting apparatus
201 power receiving apparatus

The invention claimed is:
1. A wireless power transmission system comprising:
 a power transmitting apparatus including:
  a power transmitting side active electrode,
  a power transmitting side passive electrode,
  a voltage generating circuit configured to apply a voltage between the power transmitting side active electrode and the power transmitting side passive electrode, and
  a power transmitting side reference potential electrode coupled to a reference potential of the power transmitting apparatus; and
 a power receiving apparatus including:
  a power receiving side active electrode,
  a power receiving side passive electrode,
  a load circuit coupled between the power receiving side active electrode and the power receiving side passive electrode, and
  a power receiving side reference potential electrode connected to a reference potential of the power receiving apparatus,
 wherein, when the power receiving apparatus is mounted to the power transmitting apparatus, the power transmitting side passive electrode is adjacent to the power receiving side passive electrode, the power transmitting side reference potential electrode is adjacent to the power receiving side reference potential electrode, and the power transmitting side active electrode is adjacent to the power receiving side active electrode face and capacitively coupled to each other, whereby power is transmitted from the power transmitting apparatus to the power receiving apparatus.

2. The wireless power transmission system according to claim 1,
wherein the power receiving side active electrode has a potential higher than a potential of the power receiving side passive electrode, and the power receiving apparatus side reference potential electrode has a potential between the potential of the power receiving side active electrode and the potential of the power receiving side passive electrode, and
wherein the power transmitting side active electrode has a potential higher than a potential of the power transmitting side passive electrode, and the power transmitting apparatus side reference potential electrode has a potential between the potential of the power transmitting apparatus side active electrode and the potential of the power transmitting side passive electrode.

3. The wireless power transmission system according to claim 1,
wherein the voltage generating circuit further includes a step-up transformer, and
wherein the load circuit further includes a step-down transformer.

4. The wireless power transmission system according to claim 3, wherein the step-down transformer includes a lead-out terminal of a secondary winding that is coupled to the power receiving side reference potential electrode.

5. The wireless power transmission system according to claim 4, wherein the load circuit is coupled to the power receiving side reference potential electrode.

6. The wireless power transmission system according to claim 5, wherein the lead-out terminal of the step-down transformer is disposed at a middle point of the secondary winding.

7. The wireless power transmission system according to claim 3,
wherein the step-down transformer includes a lead-out terminal of a primary winding, and
wherein the lead-out terminal is connected to the power-receiving side reference potential electrode and is disposed at a voltage dividing point, such that a voltage across the primary winding is divided in an inversely proportional manner with respect to a ratio of an area of the power receiving side active electrode to an area of the power receiving side passive electrode.

8. The wireless power transmission system according to claim 3,
wherein the step-up transformer includes a lead-out terminal of a secondary winding that is connected to the power transmitting side reference potential electrode.

9. The wireless power transmission system according to claim 8, wherein the lead-out terminal of the step-up transformer is disposed at a middle point of the secondary winding.

10. The wireless power transmission system according to claim 8, wherein the lead-out terminal of the step-up transformer is disposed at a voltage dividing point, such that a voltage across the secondary winding is divided in an inversely proportional manner with respect to a ratio of an area of the power transmitting side active electrode to an area of the power transmitting side passive electrode.

11. The wireless power transmission system according to claim 3, wherein the power receiving apparatus includes a conductive casing that is electrically connected to both the power receiving side reference potential electrode and a ground terminal of the load.

12. The wireless power transmission system according to claim 1,
wherein the power transmitting side active electrode, the power transmitting side passive electrode, and the power transmitting side reference potential electrode are disposed in the power transmitting apparatus in a first plane, and
wherein the power receiving side active electrode, the power receiving side passive electrode, and the power receiving side reference potential electrode are disposed in the power receiving apparatus in a second plane parallel to the first plane with a space between the respective electrodes of the power transmitting apparatus and the power receiving apparatus.

13. The wireless power transmission system according to claim 12,
wherein the power transmitting side active electrode, the power transmitting side passive electrode, and the power transmitting side reference potential electrode are rectangular electrodes that are disposed adjacent to one another in a predetermined direction, and
wherein the power receiving side active electrode, the power receiving side passive electrode, and the power receiving side reference potential electrode are rectangular electrodes that are disposed adjacent to one another in the predetermined direction.

14. The wireless power transmission system according to claim 12,
wherein the power transmitting side active electrode has a circle shape, the power transmitting side reference potential electrode is concentric with the power transmitting side active electrode and has a ring shape with a larger radius than the radius of the power transmitting side active electrode, and the power transmitting side passive electrode is concentric with the power transmitting side active electrode and has a ring shape with a larger radius than the radius of the power transmitting side reference potential electrode, and
wherein the power receiving side active electrode has a circle shape, the power receiving side reference potential electrode is concentric with the power receiving side active electrode and has a ring shape with a larger radius than the radius of the power receiving side active electrode, and the power receiving side passive electrode is concentric with the power receiving side active electrode and has ring shape with a larger radius than the radius of the power receiving side reference potential electrode.

15. The wireless power transmission system according to claim 1,
wherein the power transmitting side active electrode and the power transmitting side passive electrode are disposed in a first plane,
wherein the power receiving side active electrode and the power receiving side passive electrode are disposed in a second plane facing the first plane with a space between the first and second planes,
wherein the power transmitting side reference potential electrode is disposed in a third plane parallel to the first plane, with the first plane being between the second plane and the third plane, and wherein the power receiving side reference potential electrode is disposed in a fourth plane parallel to the second plane, with the second plane being between the first plane and the fourth plane.

16. The wireless power transmission system according to claim 1,
wherein, when the power receiving apparatus is mounted to the power transmitting apparatus, the power transmitting side active electrode and the power receiving side active electrode face each other, the power transmitting side passive electrode and the power receiving side passive electrode face each other with the power transmitting side active electrode and the power receiving side active electrode sandwiched therebetween, and the power transmitting side reference potential electrode and the power receiving side reference potential electrode face each other with the power transmitting side active electrode and the power receiving side active electrode and the power transmitting side passive electrode and the power receiving side passive electrode sandwiched therebetween.

17. The wireless power transmission system according to claim 1,
wherein the power transmitting side reference potential electrode comprises a conductive member that covers at least a portion of the power transmitting side active electrode and the power transmitting side passive electrode,
wherein the power receiving side reference potential electrode comprises a conductive member that covers at least a portion of the power receiving side active electrode and the power receiving side passive electrode, and
wherein respective portions of the conductive members face each other and the respective portions are capacitively coupled to each other when the power receiving apparatus is mounted to the power transmitting apparatus.

18. The wireless power transmission system according to claim 17, wherein the conductive member of the power transmitting side reference potential electrode is at least a portion of a casing of the power transmitting apparatus.

19. The wireless power transmission system according to claim 17, wherein the conductive member of the power receiving side reference potential electrode is at least a portion of a casing of the power receiving apparatus.

20. The wireless power transmission system according to claim 1, wherein the power transmitting side reference potential electrode and the power receiving side reference potential electrode are DC coupled to each other when the power receiving apparatus is mounted to the power transmitting apparatus.

* * * * *